(12) United States Patent
Vaca Torres et al.

(10) Patent No.: US 12,487,105 B2
(45) Date of Patent: Dec. 2, 2025

(54) REVERSIBLY MAGNETICALLY CLOSEABLE SENSOR HOUSING

(71) Applicant: Endress+Hauser Conducta GmbH+Co. KG, Gerlingen (DE)

(72) Inventors: Alejandro Vaca Torres, Steinheim (DE); Andreas Müller, Ostfildern (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 590 days.

(21) Appl. No.: 17/654,942

(22) Filed: Mar. 15, 2022

(65) Prior Publication Data

US 2022/0299344 A1    Sep. 22, 2022

(30) Foreign Application Priority Data

Mar. 19, 2021  (DE) .................... 10 2021 106 867.3

(51) Int. Cl.
*G01D 11/24* (2006.01)
*E05B 47/00* (2006.01)

(52) U.S. Cl.
CPC ........ *G01D 11/245* (2013.01); *E05B 47/0038* (2013.01); *Y10T 292/11* (2015.04)

(58) Field of Classification Search
CPC .. E05B 47/0038; G01D 11/245; Y10T 292/11
See application file for complete search history.

(56) References Cited

U.S. PATENT DOCUMENTS

| | | | | |
|---|---|---|---|---|
| 1,078,425 A | * | 11/1913 | Franks | E05B 47/0002 292/144 |
| 3,056,276 A | * | 10/1962 | Allander | E05B 47/0041 70/276 |
| 3,744,833 A | | 7/1973 | Berducone | |
| 4,074,341 A | * | 2/1978 | Niederost | G08B 17/113 361/600 |
| 5,760,689 A | * | 6/1998 | Holmgren | A47F 3/002 70/57.1 |

(Continued)

FOREIGN PATENT DOCUMENTS

| | | | | |
|---|---|---|---|---|
| CH | 647576 A5 | * | 1/1985 | ............. E05B 17/22 |
| CN | 202853643 U | | 4/2013 | |

(Continued)

*Primary Examiner* — David L Singer
(74) *Attorney, Agent, or Firm* — Christopher R. Powers; Endress+Hauser (USA) Holding, Inc.

(57) ABSTRACT

A sensor housing includes: a sensor body with at least one primary retainer arranged in the sensor body; a sensor cover with at least one secondary retainer, the sensor cover configured for arrangement on the sensor body such that the primary retainer and the secondary retainer are enclosed in the sensor body; and a locking unit including at least one locking element configured for releasably connecting the primary retainer and the secondary retainer, wherein the locking element includes a magnetizable material or a magnetic material and is mounted movably between a locking position, in which the locking element locks the primary retainer with the secondary retainer, and an opposing release position, such that the locking element can be moved between the locking position and the release position by an applied magnetic field.

12 Claims, 12 Drawing Sheets

(56) References Cited

U.S. PATENT DOCUMENTS

| | | | | |
|---|---|---|---|---|
| 5,802,890 | A | * | 9/1998 | Espada-Velasco .......................... E05B 73/0023 70/57.1 |
| 5,996,831 | A | * | 12/1999 | Teok .................. E05B 47/004 220/345.2 |
| 2011/0234062 | A1 | * | 9/2011 | Hsieh ................ E05B 47/004 312/223.1 |
| 2012/0151975 | A1 | | 6/2012 | Kottenstette |
| 2013/0321990 | A1 | | 12/2013 | Chung et al. |
| 2015/0035417 | A1 | * | 2/2015 | Ho ........................... G06F 1/16 403/326 |
| 2019/0025239 | A1 | * | 1/2019 | Robl ...................... G01D 11/24 |
| 2020/0158152 | A1 | * | 5/2020 | Chorny .................. F16B 12/10 |
| 2020/0378374 | A1 | | 12/2020 | Nielsen et al. |

FOREIGN PATENT DOCUMENTS

| | | | | |
|---|---|---|---|---|
| CN | 104347301 A | | 2/2015 | |
| CN | 107780721 A | * | 3/2018 | ............. E05B 65/46 |
| CN | 208173866 U | * | 11/2018 | ........... H01R 13/502 |
| CN | 208751596 U | | 4/2019 | |
| CN | 212391030 U | | 1/2021 | |
| DE | 202005015298 U1 | * | 3/2007 | ........... E05B 17/142 |
| DE | 102011079348 A1 | * | 1/2013 | ............... G01N 1/12 |
| DE | 102018129169 A1 | * | 5/2020 | ........... F16B 21/183 |
| WO | 2011124246 A1 | | 10/2011 | |

* cited by examiner

REVERSIBLY MAGNETICALLY CLOSEABLE SENSOR HOUSING

CROSS-REFERENCE TO RELATED APPLICATION

The present application is related to and claims the priority benefit of German Patent Application No. 10 2021 106 867.3, filed on Mar. 19, 2021, the entire contents of which are incorporated herein by reference.

TECHNICAL FIELD

The present disclosure relates to a reversibly closeable sensor housing.

BACKGROUND

Sensors are used in process automation technology in many fields of application. In most applications, the sensors are in direct contact with the measured medium. Sensors such as ultrasonic sensors or optical sensors for turbidity, oxygen, fluorescence or spectrometry measurement have a sensor housing for protecting sensitive sensor components from the measured medium or other environmental influences. To ensure the best possible measurement quality can be guaranteed, sensors must however be maintained regularly. For this purpose, it may be necessary to ensure access to the sensitive sensor components arranged in the sensor housing.

For this reason, two-part sensor housings are frequently used, which allow the sensor housing to be opened and closed again. Since the sensor housing comes into contact with the measured medium, it must be ensured that the two-part sensor housing does not open by itself as a result of environmental influences, for example, vibrations or shocks, during operation.

To prevent unintentional opening of the two-part sensor housing, the two parts of the sensor housing are usually adhesively bonded to each other. However, adhesive bonding has the disadvantage that the sensor housing can only be opened with difficulty for the next maintenance, and the sensor housing can be damaged during opening. Furthermore, it is possible for the sensitive sensor components to be damaged by gases released by the adhesive.

SUMMARY

It is therefore an object of the present disclosure to provide a sensor housing which can be easily opened and at the same time prevents unintentional opening of the sensor housing. This object is achieved by the sensor housing according to the present disclosure.

A sensor housing according to the present disclosure includes: a sensor body with at least one primary retainer arranged in the sensor body; a sensor cover with at least one secondary retainer; and a locking unit having at least one locking element for releasably connecting the primary retainer and the secondary retainer. The sensor cover is suitable for being arranged on the sensor body such that the primary retainer and the secondary retainer are enclosed in the sensor body. The locking element includes a magnetizable material or a magnetic material and is mounted movably between a locking position, in which the locking element locks the primary retainer with the secondary retainer, and a release position, in which the locking element does not lock the primary retainer with the secondary retainer such that the locking element can be moved between the locking position and the release position by means of an applied magnetic field.

The sensor housing according to the present disclosure makes it possible for the sensor cover to be removable from the sensor body without great application of force. This prevents the sensor housing from being unintentionally damaged when the sensor cover is removed. At the same time, the locking unit ensures that the sensor housing is effectively protected against unintentional opening, for example, during operation of the sensor. A leakproof and reliable sensor housing is thus provided.

According to one embodiment of the present disclosure, the locking unit comprises a securing element which is suitable for moving the locking element from the release position into the locking position and/or holding it in the locking position.

According to a further embodiment of the present disclosure, the securing element comprises a spring element or a permanent magnet.

According to one embodiment of the present disclosure, the sensor housing also has an internal magnetic field source and a control unit. The internal magnetic field source comprises an electrical coil which is connected to the control unit. The electrical coil is suitable for being controlled by the control unit such that a magnetic field covering the locking element is generated to move the locking element into the release position.

According to one embodiment of the present disclosure, the locking element comprises a permanent magnet.

According to one embodiment of the present disclosure, the locking element has an annular spring element, which is suitable for moving the locking element from the release position into the locking position and/or holding it in the locking position.

According to one embodiment of the present disclosure, the locking element has two opposing permanent magnets fastened to the annular spring element.

According to one embodiment of the present disclosure, the sensor body has a first thread and the sensor cover has a second thread complementary to the first thread, or the sensor body has a first bayonet closure component and the sensor cover has a second bayonet closure component complementary to the first bayonet closure component.

According to one embodiment of the present disclosure, an identification feature is applied to the outside of the sensor housing in order to indicate the location of the locking element in the sensor housing.

The above object is also achieved by a sensor housing module according to the present disclosure. The sensor housing module according to the present disclosure has a sensor housing according to the present disclosure and an external magnetic field source. The external magnetic field source includes a permanent magnet or an electrical coil.

BRIEF DESCRIPTION OF THE DRAWINGS

The present disclosure is explained in more detail on the basis of the following description of the figures. The following are shown.

DETAILED DESCRIPTION

Figure 1:
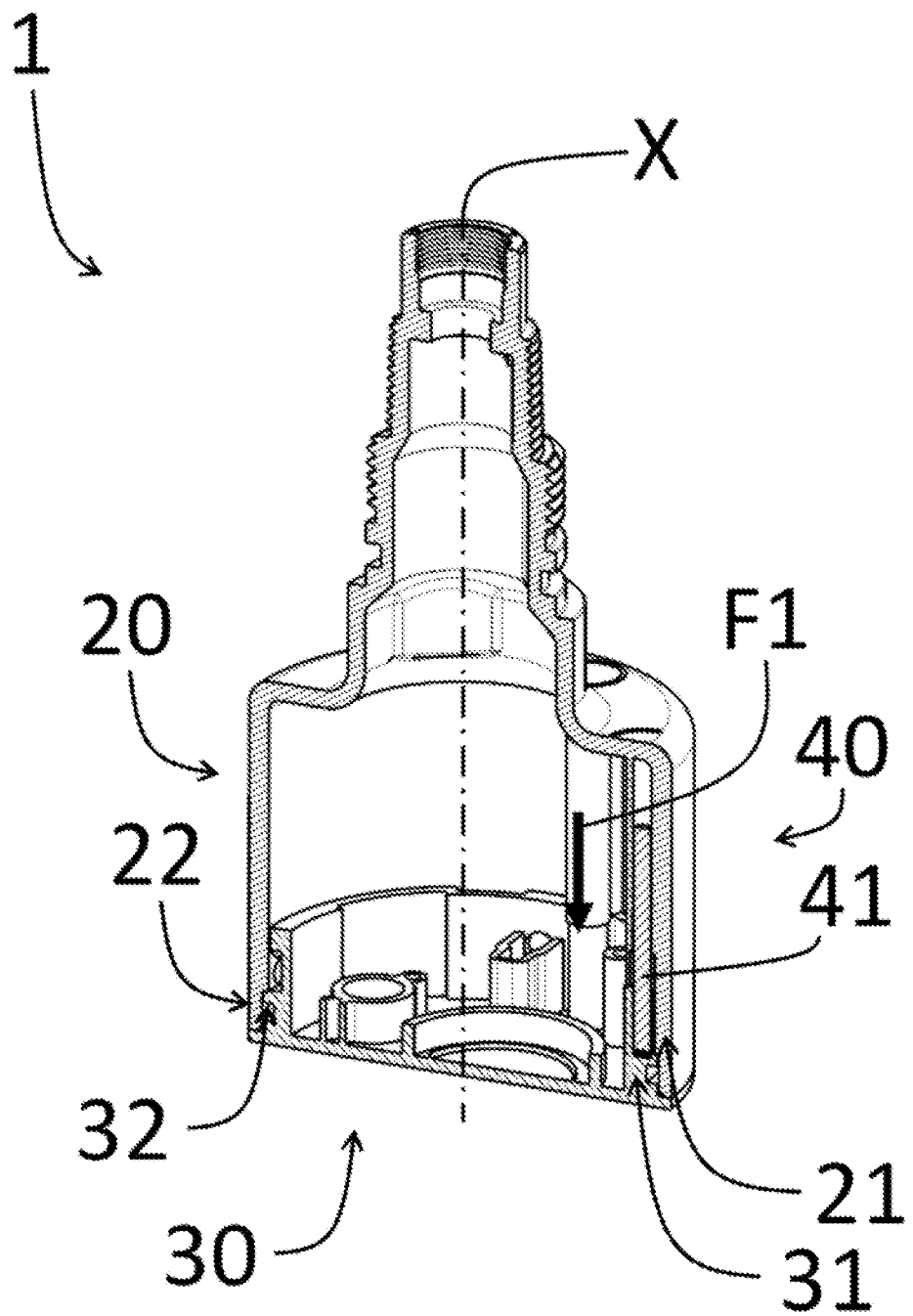
FIG. 1 shows a sectional perspective drawing of a sensor housing according to the present disclosure with a first embodiment of a locking unit.

FIG. 1 shows a sensor housing 1 having a sensor body 20, a sensor cover 30 and a locking unit 40. The sensor housing 1 is suitable for accommodating sensitive sensor components, for example, an optical transmitter/detector or an ultrasonic generator/detector or printed circuit boards with sensitive electronic components. Preferably, a sealing ring, for example, an O-ring, can also be fitted between the sensor body 20 and the sensor cover 30.

The sensor body 20 has at least one primary retainer 21, which is arranged in the sensor body 20. The primary retainer 21 is, for example, a hole, a recess, a groove or a similar cavity in the sensor body 20. In addition, the sensor body 20 can have a first thread 22 (see FIG. 1). In an alternative embodiment, the sensor body 20 has a first bayonet closure component 23 (see FIG. 9). The sensor body 20 has, for example, a cylindrical shape and extends along an extension axis X.

The sensor cover 30 has at least one secondary retainer 31. The secondary retainer 31 is, for example, a hole, a recess, a groove or similar cavity in the sensor cover 30. The sensor cover 30 is suitable for arrangement on the sensor body 20 such that the primary retainer 21 and the secondary retainer 31 are enclosed in the sensor body 20. In addition, the sensor cover 30 can have a second thread 32 complementary to the first thread 22 of the sensor body 20 (see FIG. 1) to form a threaded closure. In an alternative embodiment, the sensor cover 30 has a second bayonet closure component 33 that is complementary to the first bayonet closure component 23 (see FIG. 8) to form a bayonet closure. The sensor cover 30 has, for example, a cylindrical shape and extends along an extension axis X.

The locking unit 40 comprises at least one locking element 41. The locking element 41 is suitable for connecting the primary retainer 21 and the secondary retainer 31 so that the sensor cover 30 cannot be removed from the sensor body 20. The locking element 41 contains a magnetizable material or a magnetic material. The locking element 41 can be mounted in the primary retainer 21 and in the secondary retainer 31. The locking element 41 is mounted such that it is movable between a locking position, in which the locking element 41 locks the primary retainer 21 with the secondary retainer 31, and a release position, in which the locking element 41 releases the primary retainer 21. Since the locking element 41 contains a magnetizable material or a magnetic material, the locking element 41 is suitable for being moved between the locking position and the release position by means of an applied magnetic field. The locking element 41 is, for example, a metallic magnetizable pin (see FIGS. 1, 2 and 7), a magnetic element (see FIGS. 3 to 6 and 8 to 10), or a ring with a magnetic element (see FIGS. 11 to 15). Other embodiments of the locking element 41 are also possible, provided that they are compatible with the technical teaching of the present disclosure.

In FIG. 1, the locking element 41 is a magnetizable metallic pin which extends parallel to the extension axis X. In this embodiment, the locking element 41 is movable parallel to the extension axis X between its locking position and its release position. In the embodiment shown in FIG. 1, the sensor housing 1 has to be installed or used in such a way that the locking element 41 is moved into its locking position by a first force F1, in this case gravitational force.

Figure 2:
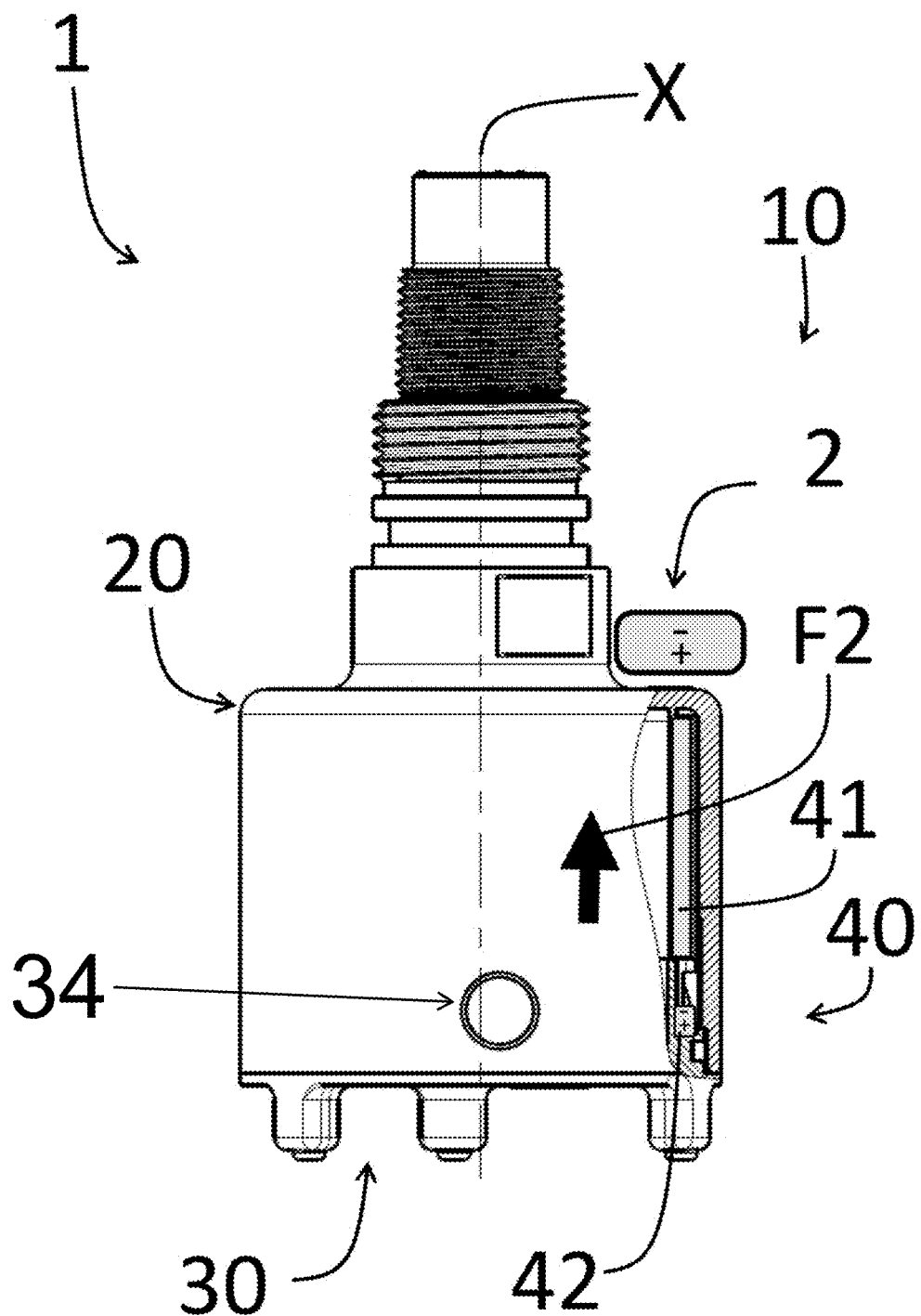
FIG. 2 shows a partial cut-away side view of the sensor housing of FIG. 1 with an alternative locking unit in its release position.

FIG. 2 shows a modified embodiment of the sensor housing 1 shown in FIG. 1. As can be seen in FIG. 2, the locking unit 40 can also have a securing element 42 which is suitable for moving the locking element 41 from the release position into the locking position and/or holding it in the locking position. This force generated by the securing element 42 is schematically illustrated in FIGS. 1, 3, 5, 8, 12 and 14 by a thin arrow which extends in the direction of the action of the force (or two such arrows). As a result, the sensor housing 1 is always locked under normal conditions, e.g., without the influence of external or internal magnetic fields. With this embodiment, the sensor housing 1 can thus be installed or used in any orientation independently of the direction of the gravitational force. In the embodiments illustrated in FIGS. 1 to 4, the securing element 42 comprises a permanent magnet. However, it can also be designed as a spring element (see FIGS. 5 to 15).

When the securing element 42 is designed as a permanent magnet, the securing element 42 is arranged in the sensor cover 30 such that the locking element 41 is exposed to the magnetic field of the permanent magnet both in its locking position and in its release position. Thus, a first force F1 which is caused by the magnetic field of the securing element 42 and is suitable for moving the locking element 41 into the locking position is exerted on the locking element 41 at all times. The first force F1 generated by the magnetic field of the securing element 42 is greater than the frictional resistances which act on the locking element 41 during the movement of the locking element 41. The frictional resistances depend on the material properties and the geometry of the locking element 41, and therefore the permanent magnet of the securing element 42 is preferably selected depending on these parameters.

FIG. 2 shows the locking element 41 in the release position. To move the locking element 41 of the embodiment shown in FIG. 2 and also the embodiment shown in FIG. 1 into the release position, the locking unit 40, as can be seen in FIG. 2, is exposed to an external magnetic field source 2, which in this case can be arranged externally to the sensor housing 1, that is to say outside the sensor housing 1. The sensor housing 1 and the external magnetic field source 2 form a sensor housing module 10. A second force F2 is exerted on the locking element 41 by the magnetic field of the external magnetic field source 2, said second force F2 being schematically illustrated in FIGS. 2, 4, 6, 7, 10, 11, 13 and 15 with a thick arrow which extends in the direction of the action of the force (or two such arrows). The second force F2 exerted on the locking element 41 by the magnetic field of the external magnetic field source 2 is of course greater than the first force F1 exerted by the securing element 42 and/or by the gravitational force, which is symbolically represented by the arrow thickness.

FIG. 2 schematically shows this external magnetic field source 2 as a permanent magnet. Of course, the external magnetic field source 2 can also be, for example, an electrical coil which is suitable for generating a magnetic field. All the permanent magnets shown in the figures have a north pole, which is denoted by "+", and a south pole, which is denoted by "−".

Figure 3:
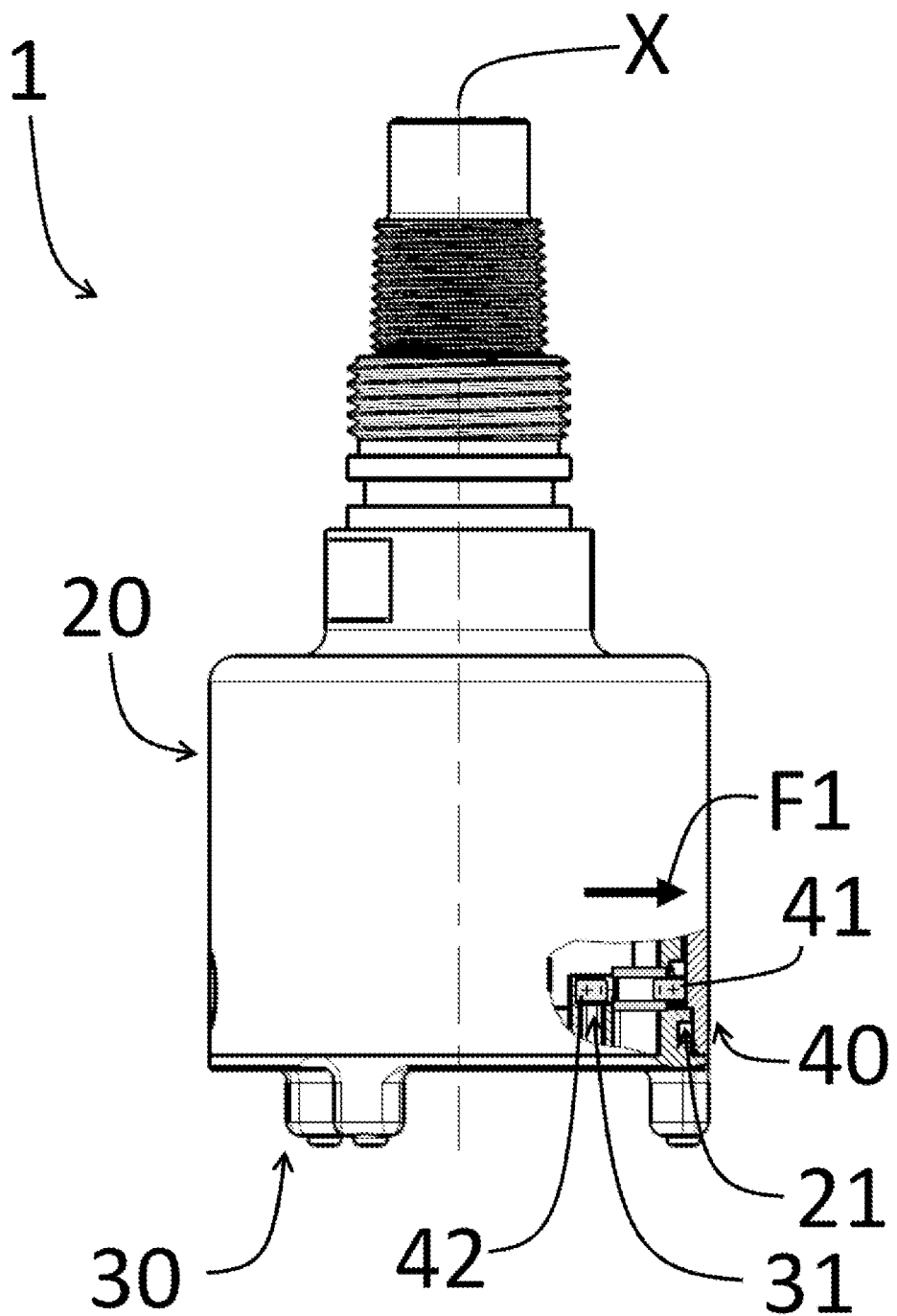
FIG. 3 shows a partial cut-away side view of a sensor housing according to the present disclosure with an alternative locking unit in its locking position made visible.

FIG. 3 shows the locking element 41 in its locking position. The securing element 42 exerts the first force F1 on the locking element 41. In the embodiment shown in FIG. 3, the locking unit 40 is arranged horizontally. The external magnetic field source 2 for moving the locking element 41 should thus be arranged radially relative to the extension axis X of the sensor housing 1 in order to move the locking element 41 into its release position. For simple detection of the location at which a magnetic field should be applied to the sensor housing 1 or the locking unit 40 arranged in the sensor housing 1 in order to open the sensor housing 1, an identification feature 34, for example, a marking, a symbol or an inscription, can be applied to the outside of the sensor housing 1, as shown most clearly in FIG. 2. The identification feature 34 allows a user to locate the locking element 41 in the sensor housing 1. This makes it possible for the external magnetic field source 2, for example, a permanent magnet or an electrical coil, to apply the magnetic field generated by the external magnetic field source 2 optimally to the locking element 41, e.g., for the second force F2 generated by the magnetic field of the external magnetic field source 2 to act optimally on the locking element 41.

Figure 4:
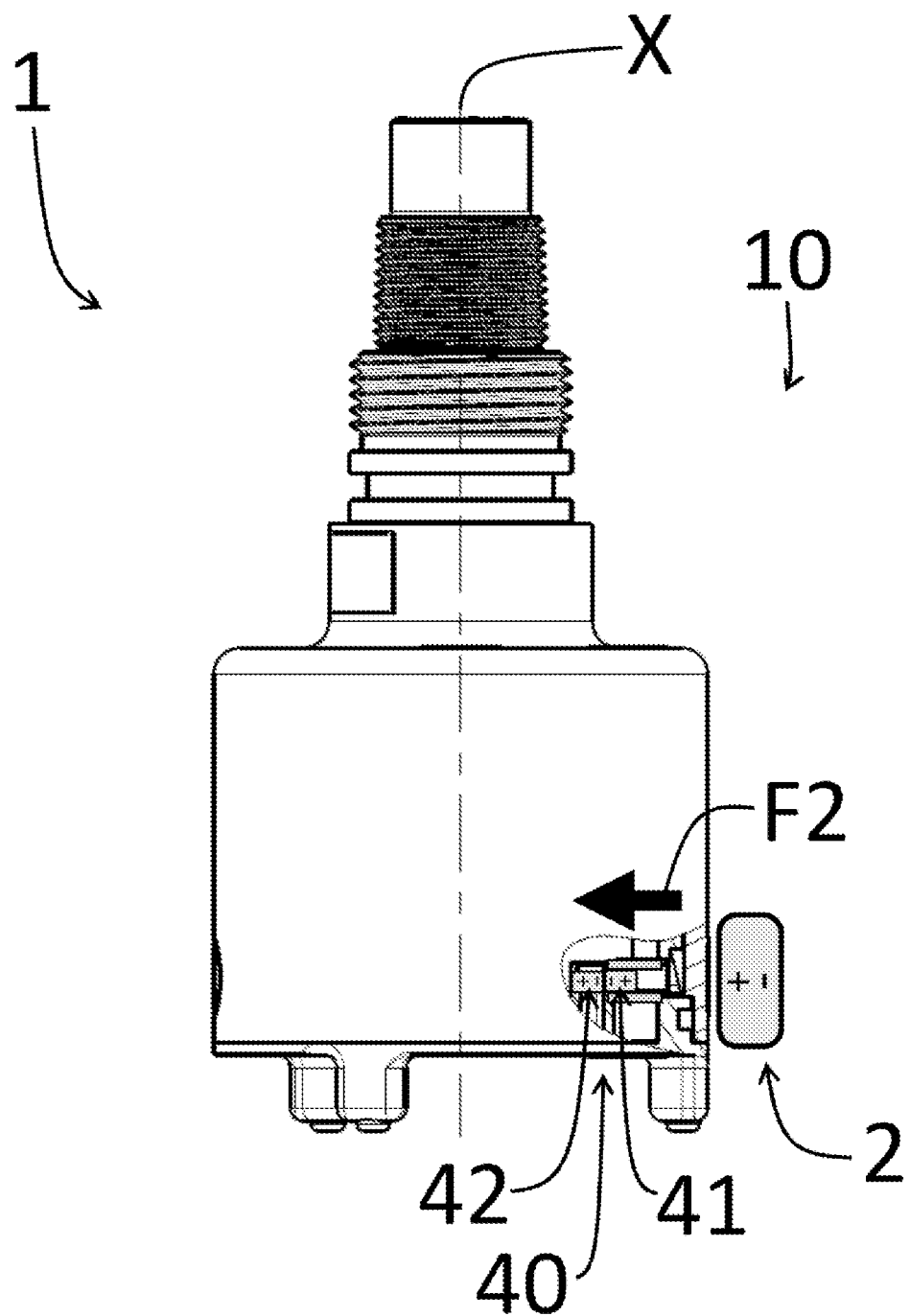
FIG. 4 shows a partial cut-away side view of the sensor housing of FIG. 3 with a magnetic field source and the locking unit in its release position.

FIG. 4 shows the locking element 41 in its release position. By means of its magnetic field, the external magnetic field source 2 exerts the second force F2 on the locking element 41, which forces the locking element 41 into its release position, so that the sensor cover 30 can be removed.

Figure 5:
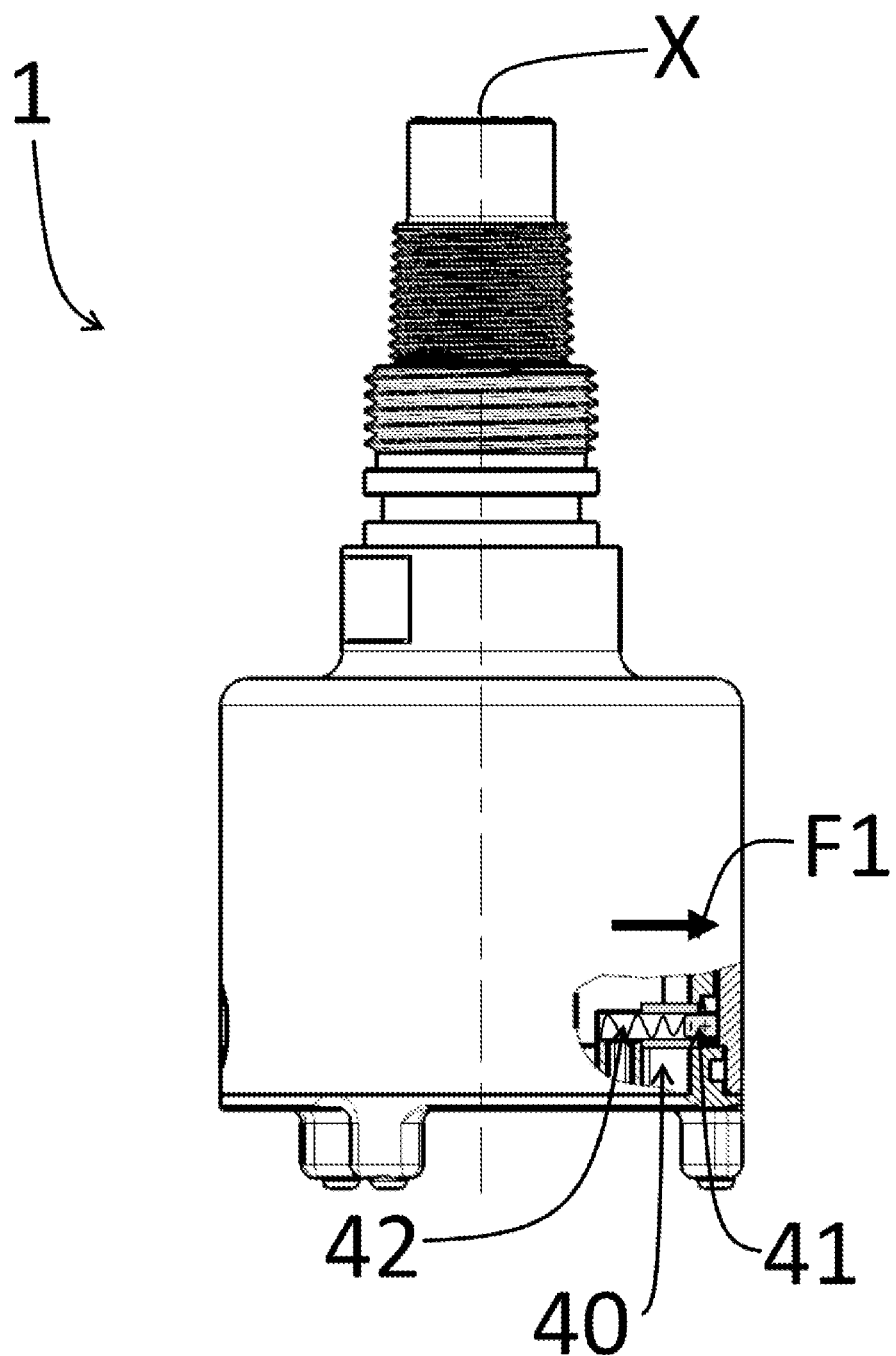
FIG. 5 shows a partial cut-away side view of a sensor housing according to the present disclosure with an alternative locking unit in its locking position made visible.

In FIG. 5, the securing element 42 is a resilient, compression spring which presses the locking element 41 into the locking position with the first force F1.

Figure 6:
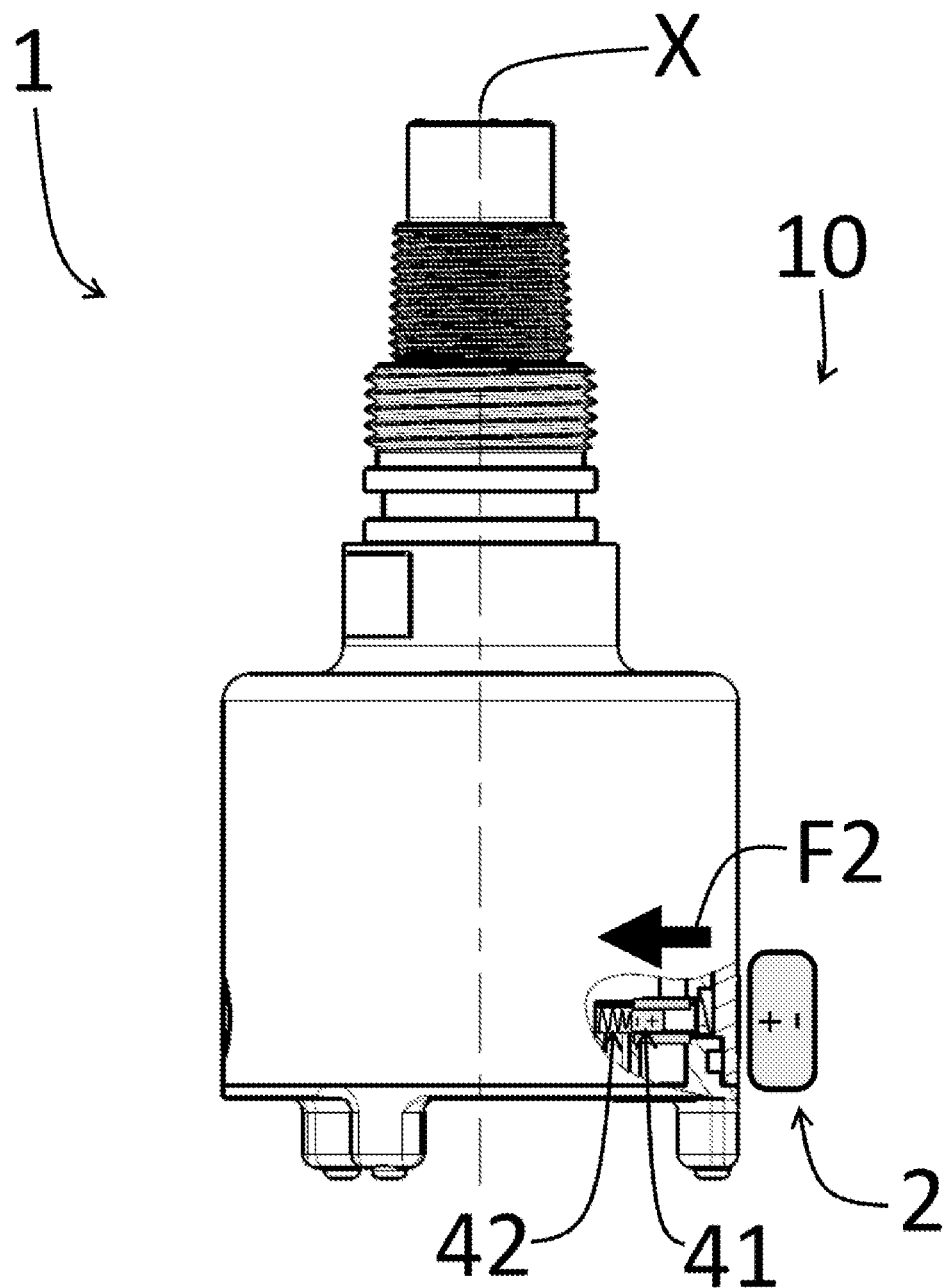
FIG. 6 shows a partial cut-away side view of the sensor housing of FIG. 5 with a magnetic field source and the locking unit in its release position.

FIG. 6 shows how the external magnetic field source 2 presses the locking element 41 into the release position by means of its magnetic field. The second force F2 of the magnetic field of the external magnetic field source 2 is stronger than the first force F1 of the resilient spring.

Figure 7:
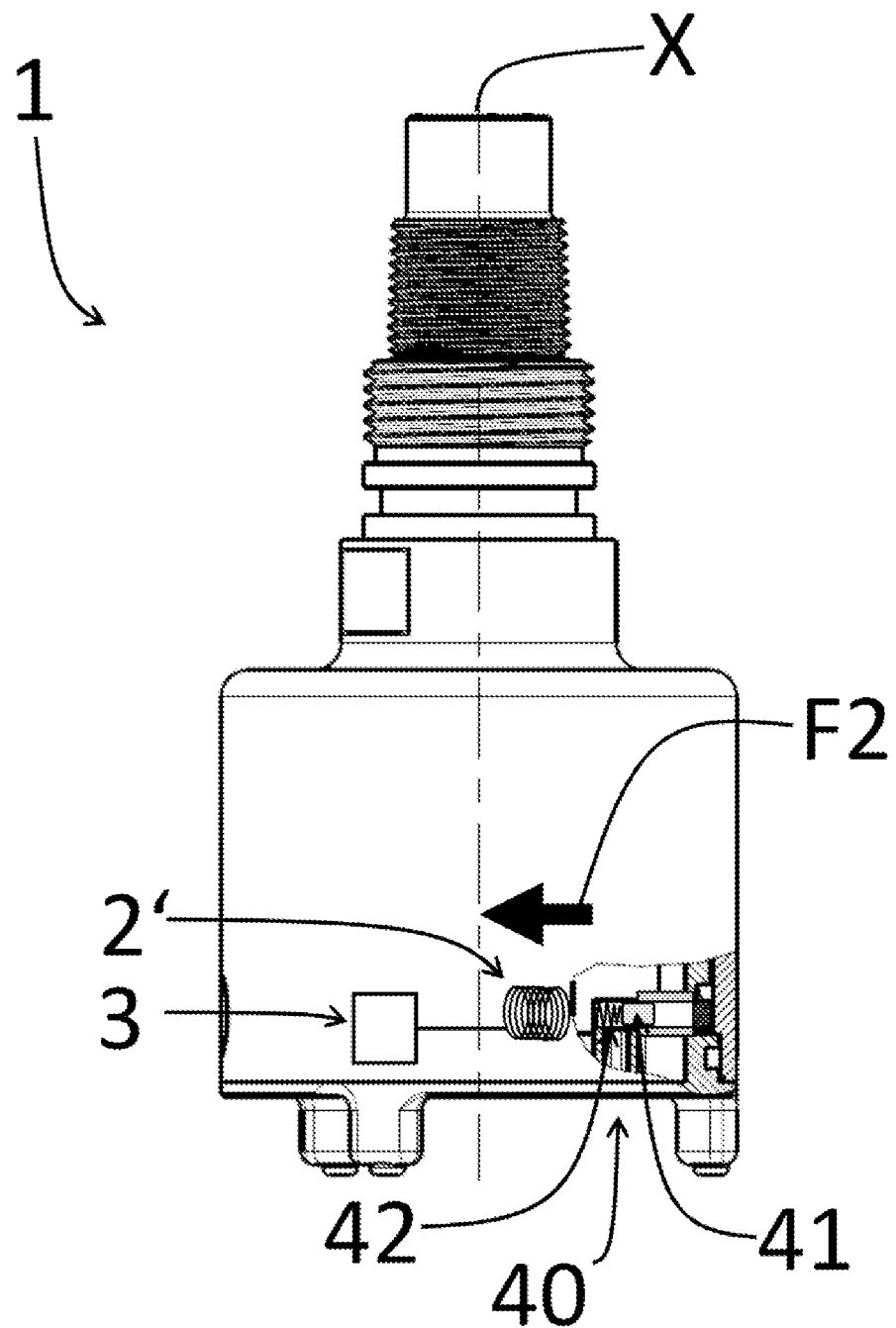
FIG. 7 shows an alternative embodiment of a sensor housing with an internal magnetic field source.

FIG. 7 shows an alternative embodiment in which an internal magnetic field source 2' is arranged in the sensor housing 1. In this variant, the internal magnetic field source 2' is designed as an electrical coil. The electrical coil is connected to a control unit 3 in order to be controlled by the control unit 3. As in the embodiment shown in FIG. 5, the locking element 41 is in this case pressed into its locking position by the securing element 42, a spring element. The locking element 41 is thus therefore in its locking position when the electric coil is in the non-energized state. If the locking element 41 is to be moved into its release position, the electrical coil is activated in such a way that a magnetic field is generated. The magnetic field of the electrical coil is such that the locking element 41 when in its locking position lies within the magnetic field of the electrical coil so that the second force F2 acts on the locking element 41. Here too, the magnetic field is selected such that the second force F2 is greater than the first force F1 generated by the securing element 42. An advantage of this embodiment is that the sensor housing 1 can thus be opened easily by activating the internal magnetic field source 2'. In FIG. 7, the internal magnetic field source 2' is drawn next to the locking unit 40 for the sake of simplicity, but can also be arranged, for example, in such a way that the locking unit 40 or parts thereof are enclosed by the internal magnetic field source 2', e.g., the electrical coil.

The embodiment shown in FIG. 7 is, of course, also, insofar as technically possible, combinable with the other embodiments described here. For example, it is possible to move the locking element 41 into its release position either by means of the internal magnetic field source 2' or by means of the external magnetic field source 2.

Figure 8:
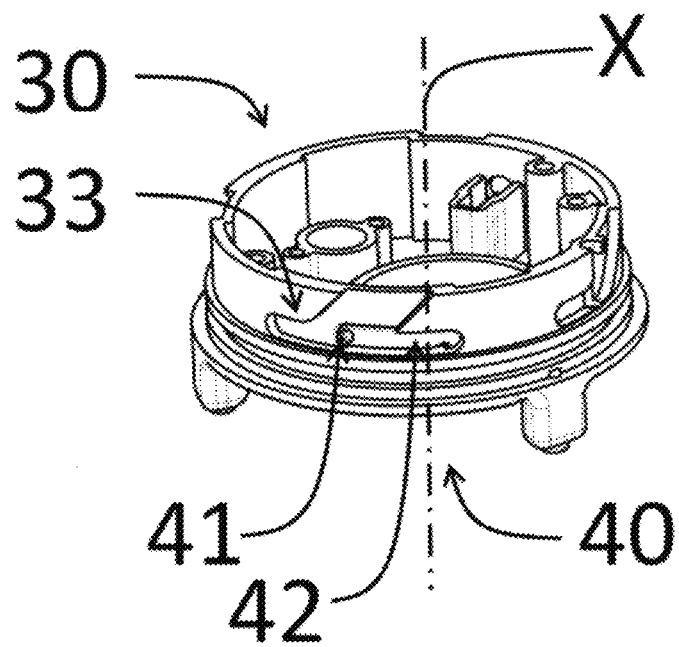
FIG. 8 shows a perspective view of an embodiment of the sensor cover with a bayonet closure.

FIG. 8 shows the sensor cover 30 with a second bayonet closure component 33.

Figure 9:
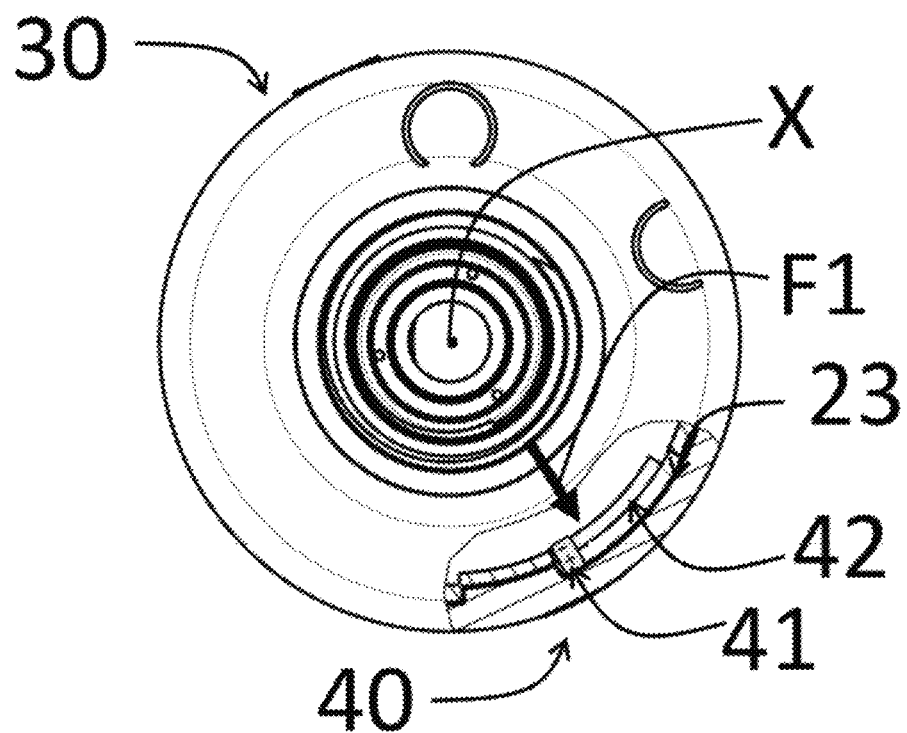
FIG. 9 shows a partial cut-away top view of the sensor cover of FIG. 7 with a visible alternative locking unit in its locking position.

FIG. 9 shows a view of the sensor cover 30 from below, i.e., along the extension axis X of the sensor housing 1. The locking unit 40 arranged on the inside of the sensor cover 30 is shown visible. In this embodiment, the securing element 42 is movable radially to the extension axis X, i.e., exerts the first force F1 on the locking element 41 radially relative to the extension axis X. The locking element 41 is fastened to the securing element 42, for example, adhesively bonded.

The embodiment shown in FIG. 9 is particularly suitable for variants of the sensor housing 1 which have a threaded screw connection or a bayonet closure for connecting sensor body 20 and sensor cover 30. In the locking position, the locking element 41 thus prevents or limits a rotational movement of the sensor cover 30 relative to the sensor body 20.

Figure 10:
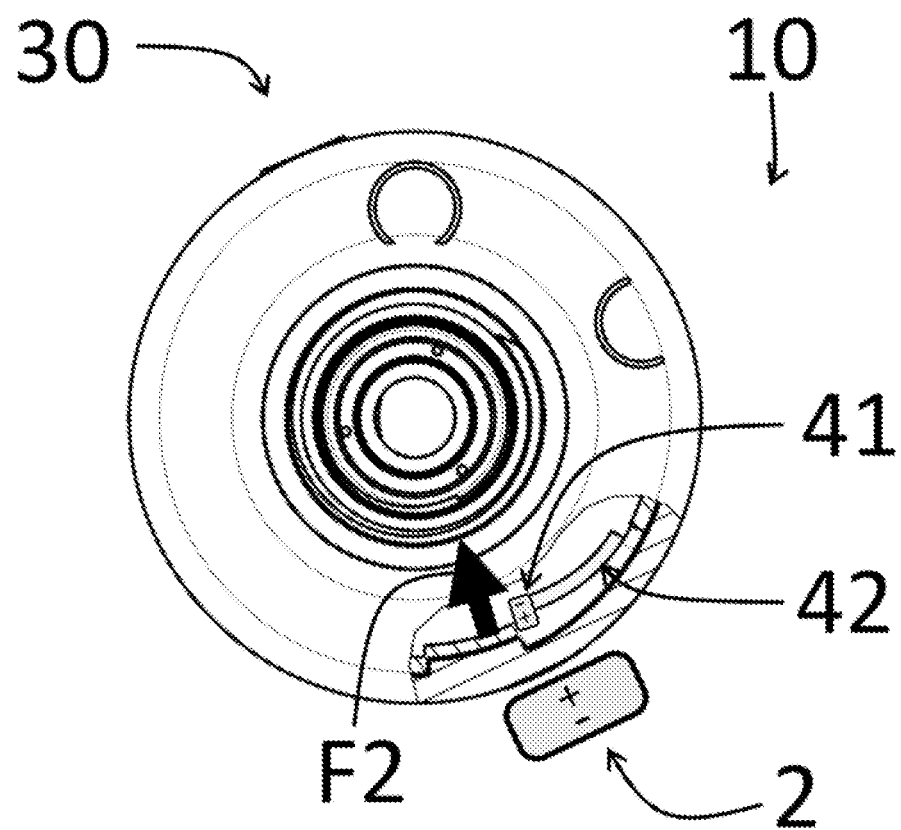
FIG. 10 shows a partial cut-away top view of the sensor cover of FIG. 7 with a magnetic field source and the locking element in its release position.

FIG. 10 shows the locking element 41 in its release position. The second force F2 generated by the magnetic field of the magnetic field source 2 is represented by the arrow and moves the locking element 41 out of the locking position into the release position.

Figure 11:
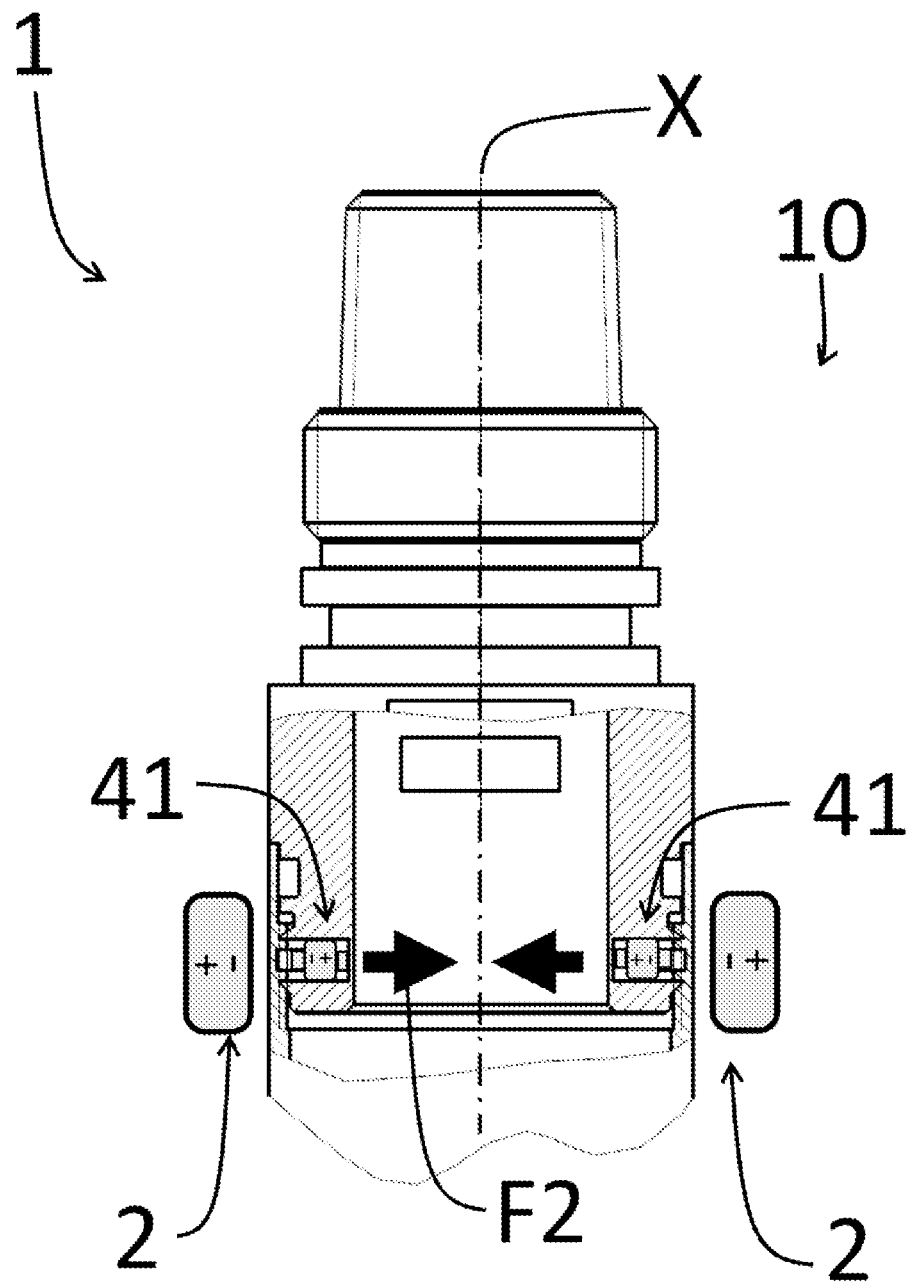
FIG. 11 shows a sectional side view of a further embodiment of the sensor housing with a further embodiment of the locking unit.

FIG. 11 shows a partial sectional view of a further embodiment of a sensor housing 1. The securing element 42 of the locking unit 40 is here of annular design and extends around the extension axis X. In this embodiment, the locking unit 40 is mounted in the secondary retainer 31, here for example, a recess, of the sensor body 20 and is suitable for engaging in the primary retainer 21, here for example, a groove, of the sensor cover 30.

Figure 12:
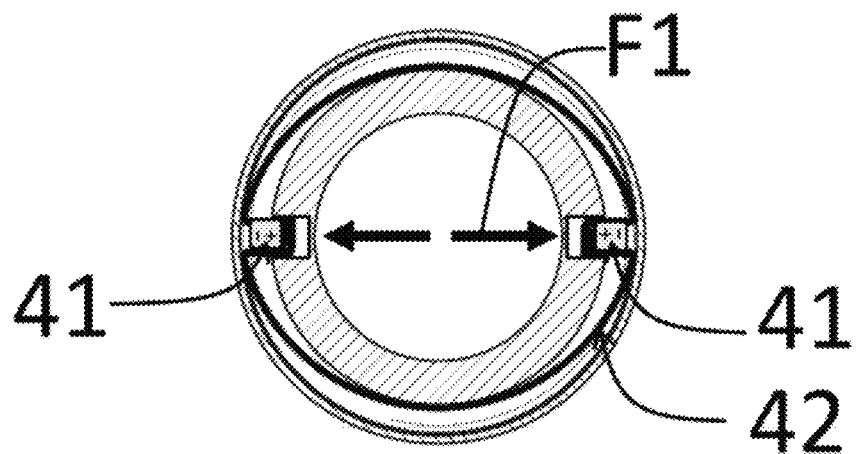
FIG. 12 shows a sectional top view of the sensor housing of FIG. 10 with the locking unit in its locking position.

FIG. 12 shows the locking unit 40 shown in FIG. 11 with the locking element 41 and the securing element 42 in its locking position. The locking element 41 is fastened to the securing element 42, for example, adhesively bonded or fixed in another known way of fastening. Here, the securing element 42 has such a shape, for example, oval, that it has a pretension when it is arranged in the sensor housing 1. The pretension of the securing element 42 generates the first force F1, which presses the locking element 41 and/or the securing element 42 into the primary retainer 21, here a groove, of the sensor body 20. The locking element 41 and/or the securing element 42, when the sensor cover 30 is arranged in the sensor body 20, thus engages in the groove 21 of the sensor body 20. In this embodiment, the securing element 42 is made of metal or plastic, for example.

Figure 13:
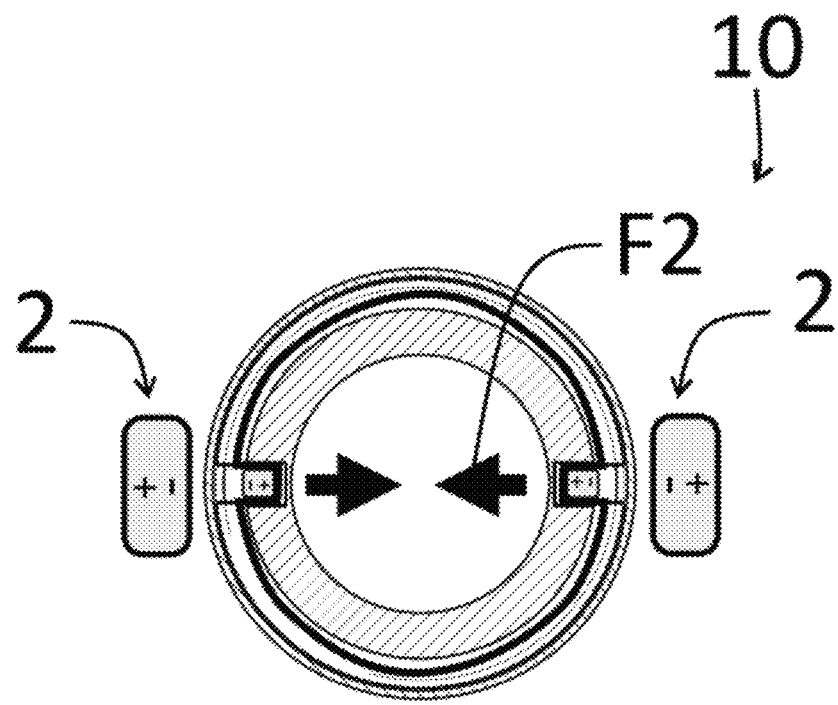
FIG. 13 shows a sectional top view of the sensor housing of FIG. 10 with a magnetic field source and the locking unit in its release position.

FIG. 13 shows the locking element 41 in its release position. The magnetic field of the magnetic field source 2 generates a second force F2, which is greater than the first force F1 generated by the securing element 42, so that the securing element 42 is deformed; for example, the securing element 42 is forced from its oval shape into a circular shape so that the securing element 42 no longer engages in the groove 21 of the sensor cover 30.

As shown in FIGS. 11 to 13, the locking unit 40 preferably has two locking elements 41 which are fastened to the annular securing element 42 opposite each other. In order to move the locking element 41 into its release position, the locking elements 41 should be subjected to a magnetic field at the same time in this embodiment.

Figure 14:
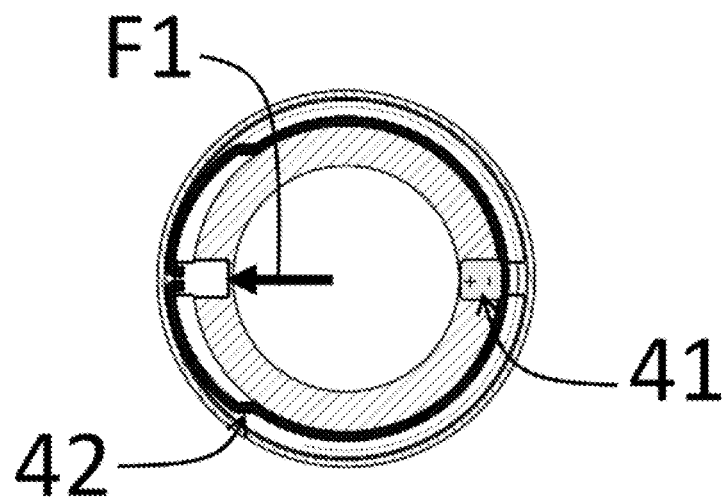
FIG. 14 shows a sectional top view of the sensor housing with an alternative embodiment of the locking unit in its locking position.

FIG. 14 shows an alternative embodiment of the securing element 42. Here too, the locking element 41 is fastened, for example, adhesively bonded, to the securing element 42. In this exemplary embodiment, the securing element 42 is a clamping ring which has a pretension due to its shape when the clamping ring is inserted in the sensor housing 1. The clamping ring extends around the extension axis X. The clamping ring sits in the secondary retainer 31, for example, a recess in the sensor cover 30. The locking element 41 is designed such that only a part of the locking element 41 engages in the primary retainer 21, here also a groove or recess, of the sensor body 20. This part engaging in the groove or recess has, for example, a larger radius to the extension axis X than has the remaining part of the securing element 42.

Figure 15:
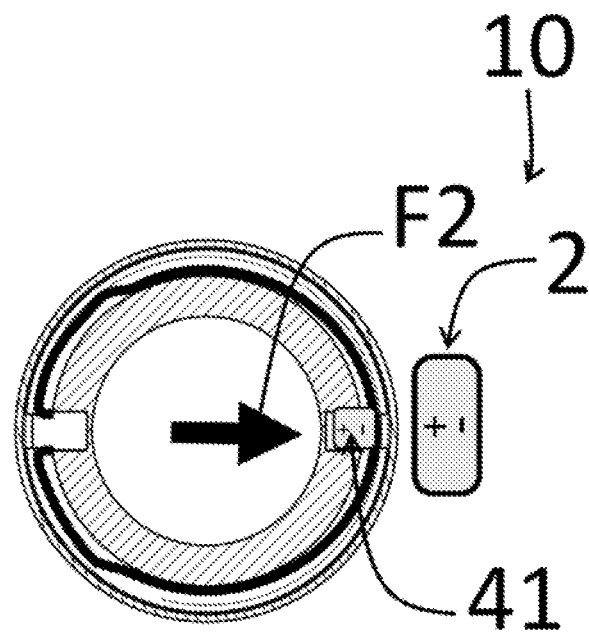
FIG. 15 shows a sectional top view of the sensor housing shown in FIG. 13 with a magnetic field source and the locking unit in its release position.

FIG. 15 shows the locking element 41 in its release position. The second force F2 generated by the magnetic field of the magnetic field source 2 moves the locking element 41, again a permanent magnet, so that the clamping ring is pulled out of the groove. The clamping ring also deforms here as a result of the second force F2, as described in the embodiment of FIGS. 11 to 13.

The invention claimed is:

1. A sensor housing, comprising:
a sensor body including a primary retainer disposed in the sensor body;
a sensor cover including a secondary retainer, wherein the sensor body and the sensor cover are complementarily configured such that the sensor body is rotated relative to the sensor cover to close and open the sensor housing, wherein the secondary retainer is a circumferential groove in a wall of the sensor cover; and
a locking unit including a locking element configured to releasably connect the primary retainer and the secondary retainer,
wherein the locking element comprises a magnetizable material or a magnetic material and is mounted movably between a locking position, in which the locking element locks the primary retainer relative to the secondary retainer as to prevent rotation and separation of the sensor cover relative to the sensor housing, and a release position, in which the locking element does not lock the primary retainer relative to the secondary retainer, such that the sensor housing can be opened and the sensor cover separated from the sensor body,
wherein the locking element is configured to be moved between the locking position and the release position by an applied magnetic field.

2. The sensor housing of claim 1, wherein the locking unit comprises a securing element configured to move the locking element from the release position to the locking position and/or to hold the locking element in the locking position.

3. The sensor housing of claim 2, wherein the securing element comprises a spring element or a permanent magnet.

4. The sensor housing of claim 3, further comprising:
an internal magnetic field source comprising an electrical coil; and
a control unit connected to the electrical coil,
wherein the electric coil is adapted to be controlled by the control unit as to generate a magnetic field that extends to at least cover the locking element as to move the locking element to the release position.

5. The sensor housing of claim 3, wherein the securing element comprises a compression spring.

6. The sensor housing of claim 2, wherein the primary retainer is a ridge of the sensor body that is complementary to the secondary retainer of the sensor cover.

7. The sensor housing of claim 1, wherein the locking element comprises a permanent magnet.

8. The sensor housing of claim 1, wherein the locking securing element is an annular spring element configured for moving the locking element from the release position to the locking position and/or to hold the locking element in the locking position.

9. The sensor housing of claim 8, wherein the locking element includes two opposing permanent magnets fastened to the annular spring element.

10. The sensor housing of claim 1, wherein the sensor body includes a first thread, and the sensor cover includes a second thread complementary to the first thread, or
wherein the sensor body includes a first bayonet closure component, and the sensor cover includes a second bayonet closure component complementary to the first bayonet closure component.

11. The sensor housing of claim 1, further comprising an identification feature disposed on an exterior of the sensor housing and configured to indicate the location of the locking element in the sensor housing.

12. A sensor housing module, comprising:
a sensor housing according to claim 1; and
an external magnetic field source, wherein the external magnetic field source comprises a permanent magnet or an electrical coil.

* * * * *